(12) United States Patent
Hong et al.

(10) Patent No.: US 12,452,361 B1
(45) Date of Patent: Oct. 21, 2025

(54) CALLER IDENTIFICATION PRESENTATION FROM THIRD-PARTY CALL SYSTEMS

(71) Applicant: Zoom Communications, Inc., San Jose, CA (US)

(72) Inventors: Karen Kuei Ren Hong, Los Altos, CA (US); Kwan Seng Low, San Jose, CA (US); Hui Sun, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 53 days.

(21) Appl. No.: 18/362,657

(22) Filed: Jul. 31, 2023

(51) Int. Cl.
*H04M 3/42* (2006.01)
*H04M 7/00* (2006.01)

(52) U.S. Cl.
CPC ..... *H04M 3/42042* (2013.01); *H04M 7/0075* (2013.01)

(58) Field of Classification Search
CPC .............. H04M 3/42042; H04M 7/0075
USPC ...................................... 379/142.04
See application file for complete search history.

(56) References Cited

U.S. PATENT DOCUMENTS

| | | | |
|---|---|---|---|
| 5,930,701 A | 7/1999 | Skog | |
| 7,783,016 B2 | 8/2010 | Wolfman et al. | |
| 8,331,907 B2 | 12/2012 | Jiang | |
| 8,576,835 B2 | 11/2013 | Acharya et al. | |
| 9,237,430 B2 | 1/2016 | Jiang | |
| 9,264,299 B1* | 2/2016 | Palmer | H04M 7/0057 |
| 11,758,049 B1* | 9/2023 | Gentry | H04M 3/436 |
| | | | 379/265.02 |
| 2004/0125819 A1* | 7/2004 | Binder | H04M 7/0081 |
| | | | 379/93.05 |
| 2005/0238160 A1* | 10/2005 | Sunstrum | H04M 7/0069 |
| | | | 379/90.01 |
| 2006/0007915 A1 | 1/2006 | Frame | |
| 2009/0225745 A1* | 9/2009 | Jackson | H04L 65/1104 |
| | | | 370/352 |
| 2010/0034365 A1* | 2/2010 | Wadhwa | H04M 15/06 |
| | | | 379/142.04 |
| 2010/0240344 A1* | 9/2010 | Jin | H04L 65/1104 |
| | | | 455/412.2 |
| 2011/0026700 A1* | 2/2011 | Clark | H04L 65/1073 |
| | | | 379/142.15 |
| 2017/0201627 A1* | 7/2017 | Fukuda | H04M 7/125 |

FOREIGN PATENT DOCUMENTS

AU 2017363422 B2 5/2022

* cited by examiner

*Primary Examiner* — Binh Kien Tieu
(74) *Attorney, Agent, or Firm* — Young Basile Hanlon & MacFarlane, P.C.

(57) ABSTRACT

Caller identification (ID) is preserved when a legacy third-party call system is integrated with a software platform. Invite messages associated with a call from the legacy third-party call system are modified to provide the ability to preserve the originating caller ID information to pass to a voice over internet protocol (VOIP) phone associated with the software platform for display. The invite messages may be modified by a foreign exchange office (FXO) port associated with the software platform. The software platform transmits an FXO indicator to the VOIP phone to indicate to the VOIP phone to display the originating caller ID information.

20 Claims, 9 Drawing Sheets

CALLER IDENTIFICATION PRESENTATION FROM THIRD-PARTY CALL SYSTEMS

FIELD

This disclosure generally relates to call routing in telephony systems, and, more specifically, to caller identification (ID) presentation from third-party call systems.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that those who are generally increasingly mobile may be unable to rely upon them. One type of system that addresses problems such as these includes a unified communications as a service (UCaaS) platform, which includes several communications services integrated over a network, such as the Internet, to deliver a complete communication experience regardless of physical location.

Organizations, such as hospitals, nursing homes, hotels, and the like, have a variety of systems that require a private branch exchange (PBX) to have a foreign exchange office (FXO) port. Some of these legacy systems may be important to the day-to-day operation of an organization. These legacy systems are analog systems that can be expensive to upgrade, and integrating these legacy systems with a software platform, such as a UCaaS platform that supports digital communications, may be a cost-effective solution.

However, technical challenges can arise when attempting to integrate these analog legacy systems with a digital software platform. For example, certain features, such as caller ID, may be lost when integrating an analog legacy system with a digital software platform.

In one specific example in which the legacy third-party call system application is used with a nurse station in a hospital, the nurse call solution can provide information that can indicate what room a patient attempting to utilize the system is in; however, the server of the software platform may be unable to preserve the caller ID information from the FXO line because it is unable to read an analog signal from the legacy third-party call system. By not relaying a digital signal with the caller ID information to a voice-over-internet protocol (VOIP) phone of the software platform, parties to a call may lack important information. For example, referring to the nurse station described above, supporting parties may not be able to identify where the patient is located where the caller ID information is not relayed to a VOIP phone of the software platform. Accordingly, there is no way to know the original caller ID from the FXO call (i.e., a call from a device of the legacy third-party system).

Implementations of this disclosure address problems such as these by implementing an FXO port to integrate with the software platform that converts analog signals from the legacy third-party call system to digital signals that are compatible with the software platform. The FXO port can be used to modify the analog signals to preserve caller ID information from an FXO originating device to enable the caller ID information to be relayed (e.g., by a server of a software platform, such as a UCaaS platform) to a destination VOIP phone for display. The analog signals are converted to digital signals, and an FXO indicator is added to the digital signals. The FXO indicator indicates to the VOIP phone to display the caller ID information. As such, the caller ID information is preserved, and the VOIP phone user can see who the original caller is based on the displayed caller ID. In the nurse station example, calls from a patient room to the nurse station have the patient room caller ID information such that nurses can identify where the calls are coming from and react accordingly.

Figure 1:
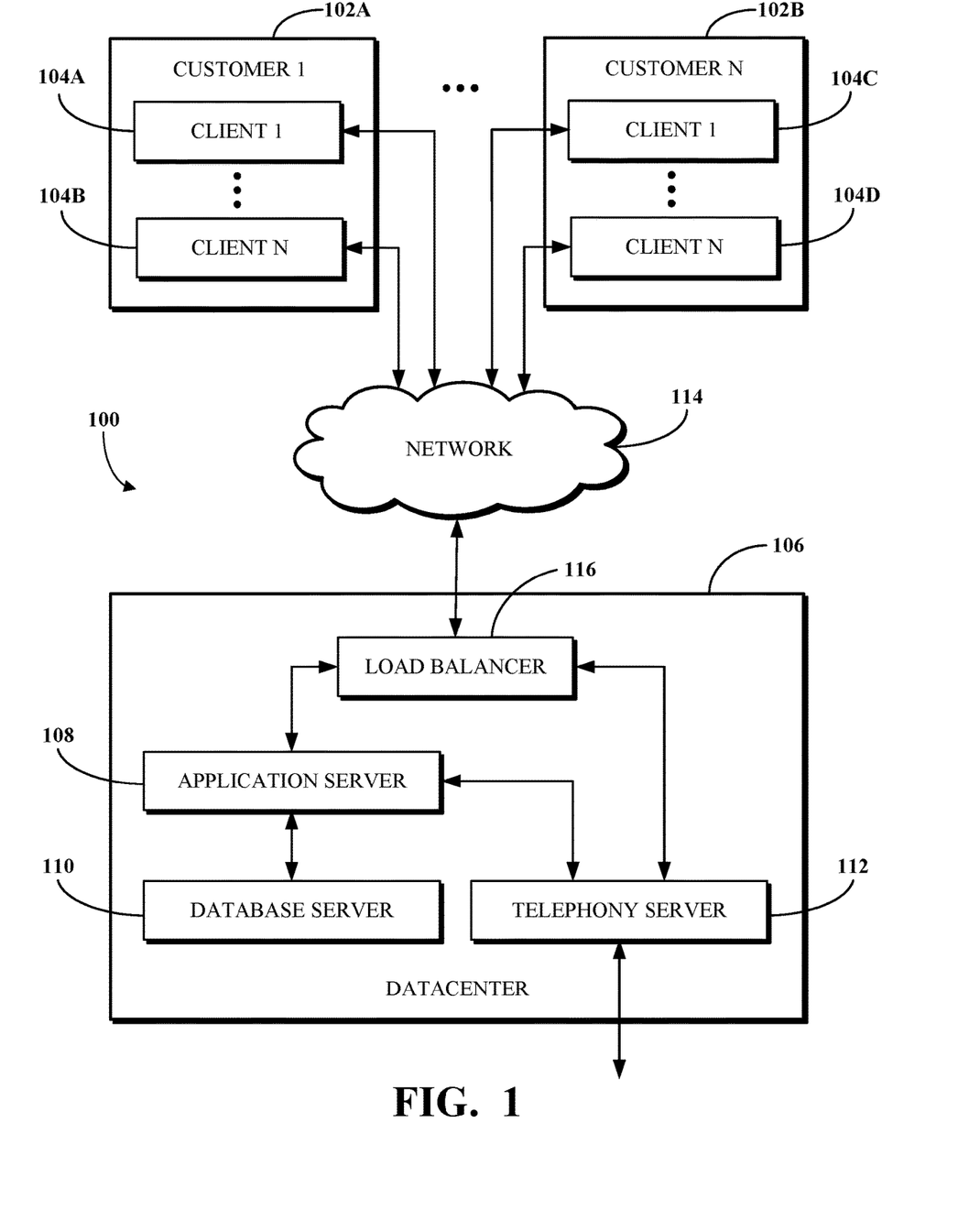
FIG. 1 is a block diagram of an example of an electronic computing and communications system.

To describe some implementations in greater detail, reference is first made to examples of hardware and software structures used to implement a system for caller ID presentation from third-party call systems. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be VOIP-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
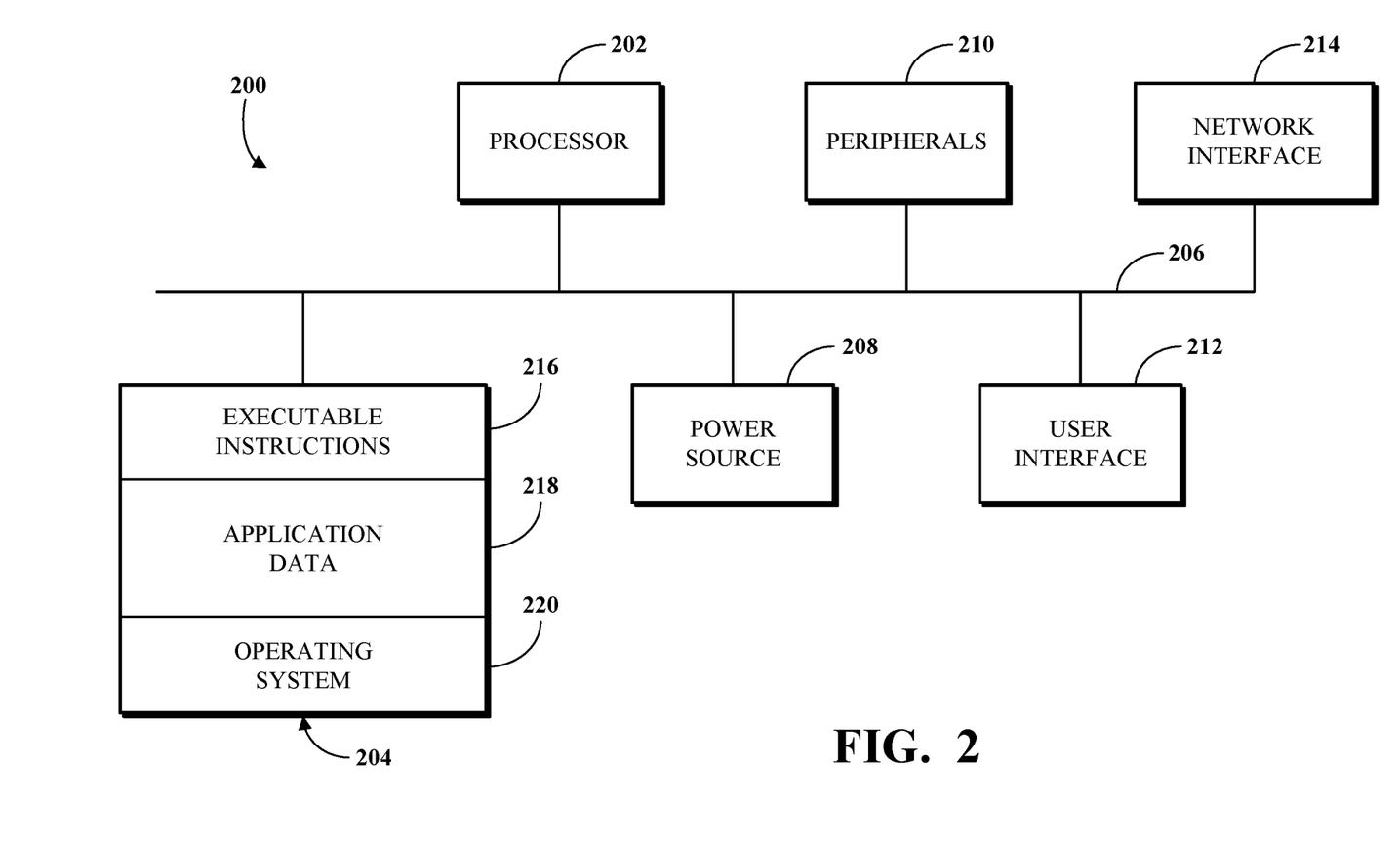
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
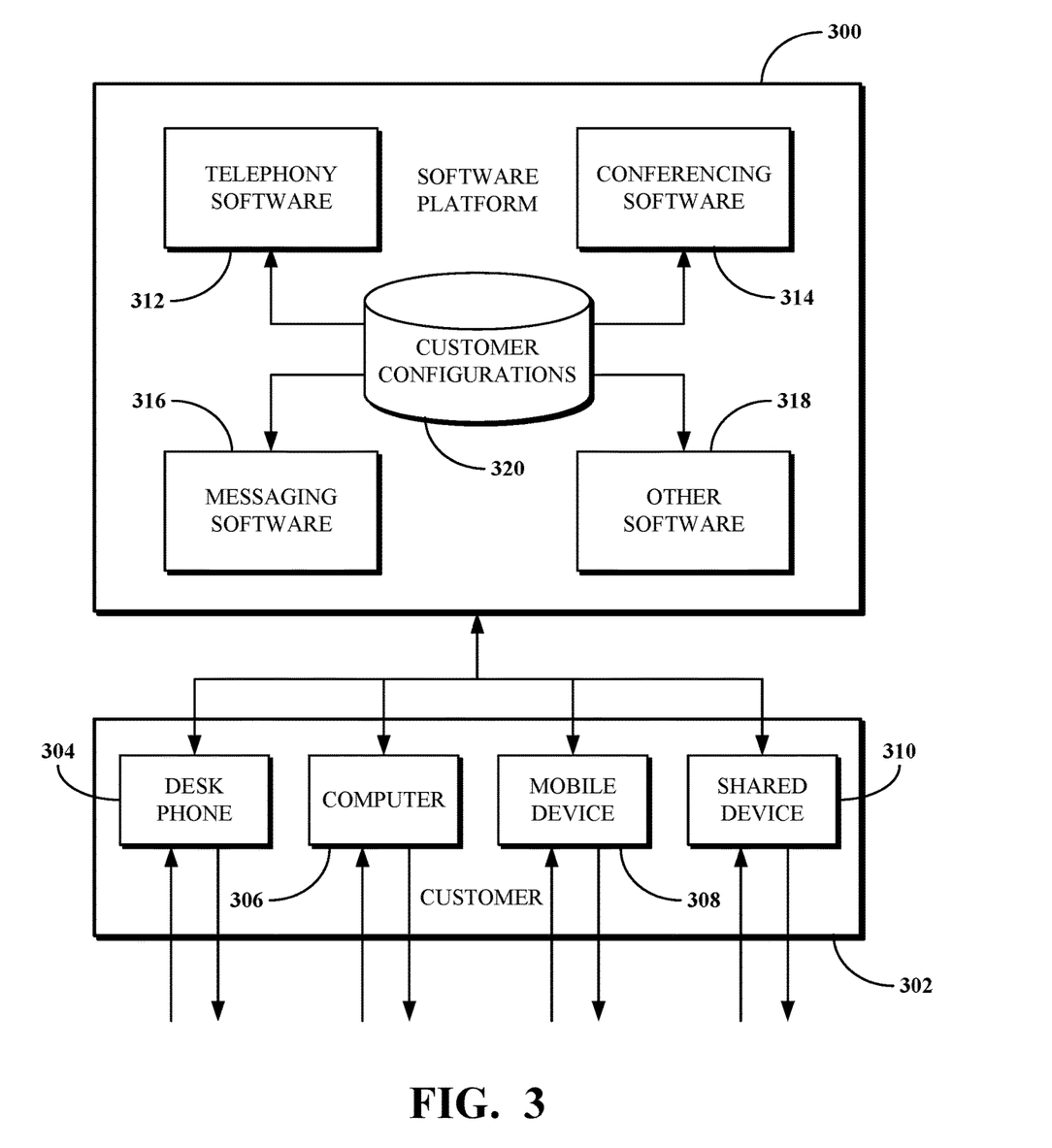
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for caller ID presentation from third-party call systems. In some such cases, the telephony software 312 can include the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
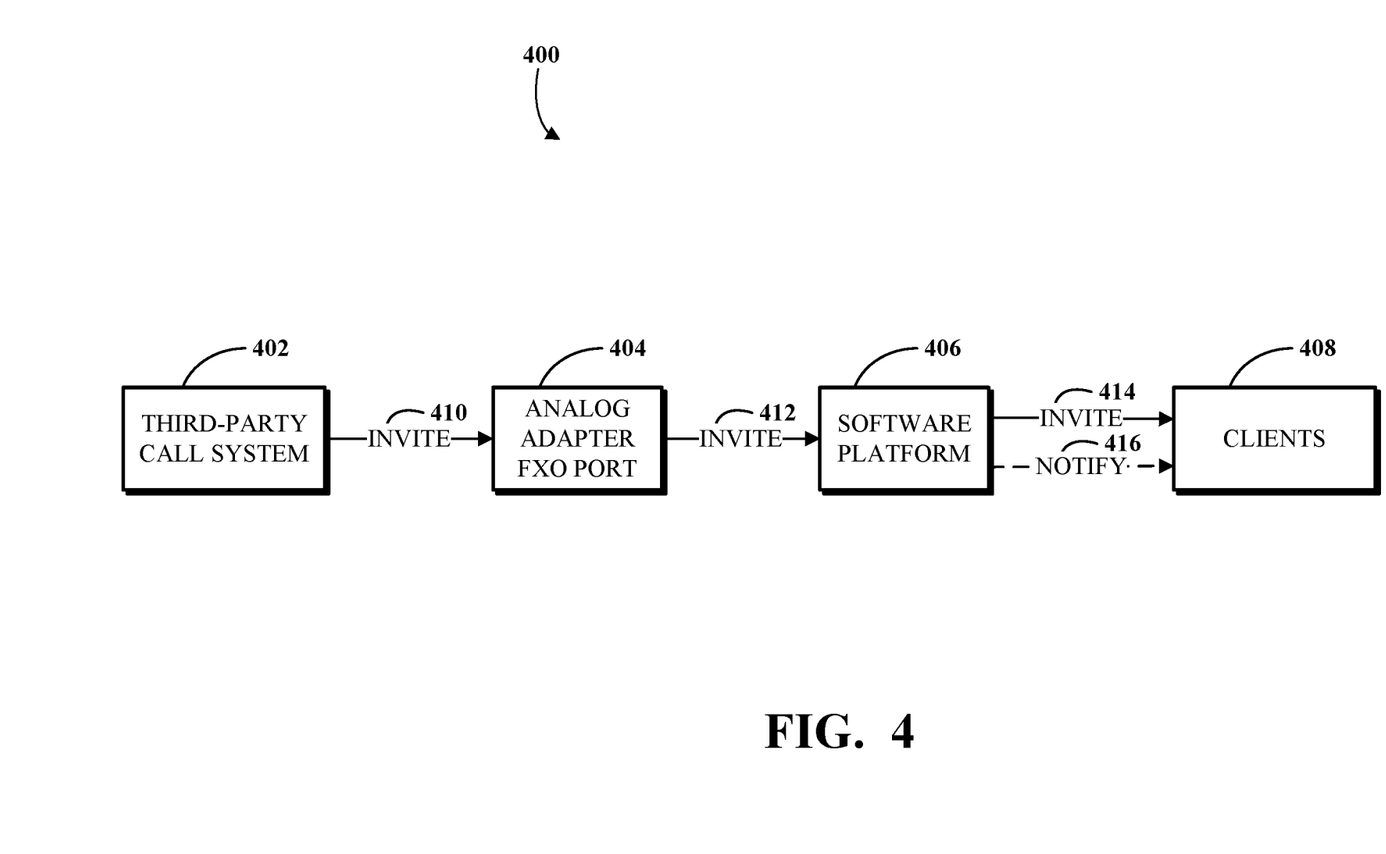
FIG. 4 is a block diagram of an example of a telephony system integrated with a third-party call system.

FIG. 4 is a block diagram of an example of a telephony system 400 integrated with a third-party call system 402. The telephony system 400 includes an FXO port 404, a software platform 406, and one or more clients 408. The third-party call system 402 may be a legacy enterprise call system that does not support VOIP devices, such as a call system used in a hospital, nursing home, hotel, or other organization that utilizes a PBX. The third-party call system may include telephony devices (not shown) that are configured to make and receive calls. The telephony devices are legacy devices that do not support VOIP calls. The software platform 406 may be the software platform 300 shown in FIG. 3. The one or more clients 408 may include one or more of the clients 304 to 310 shown in FIG. 3.

The third-party call system 402 is configured to transmit an invite message 410, such as a SIP invite message, to initiate a call between a telephony device of the third-party call system 402 and at least one client of the one or more clients 408. The invite message 410 includes one or more fields, such as a from field that includes a caller name (e.g., "Room 101") and an extension number field that includes the extension number (e.g., "101") of the device of the third-party call system 402 that is initiating the call. The extension number may be referred to as the caller ID.

The FXO port 404 is a hardware device configured to enable communication between the third-party call system 402 and the software platform 406. The FXO port 404 may be an analog adapter that is configured to modify one or more messages received from the third-party call system 402. The FXO port 404 is configured to receive the invite message 410. The FXO port 404 is configured to retain the caller name from the caller name field of the invite message 410. The FXO port 404 is configured to change the caller ID to the software platform register number (e.g., 12345678901234567890) to obtain a modified invite message 412. The modified invite message 412 may be a modified SIP invite message that is transmitted to the software platform 406. By changing the caller ID, the FXO port modifies the invite message 410 such that the software platform 406 can accept the call from the FXO port 404. The FXO port 404 may obtain a SIP register number based on a binding between the telephony device of the third-party call system 402 and a user account of the software platform 406 to change the caller ID to the software platform register number. The binding may indicate multiple configurations for the telephony device of the third-party call system 402 from which information such as the SIP register number and user account password may be obtained.

The software platform 406 is configured to receive the modified invite message 412 and determine whether the call is an FXO call (i.e., a call from a device of the third-party call system 402). The discussion of how the software platform 406 determines whether the call is an FXO call is provided in the discussion of FIGS. 7A and 7B. The software platform 406 routes the call to a client of the one or more clients 408 (i.e., the destination client) when it is determined that the call is an FXO call. The software platform 406 routes the call to the destination client by generating a modified invite message 414 and transmitting the modified invite message 414 to the destination client. The modified invite message 414 includes the caller name field, a platform short number field, and an FXO flag. The caller name field, the platform short number field, and the FXO flag may be call option fields in a call information header of the modified invite message 414 or a P-asserted-identity (PAI) header of the modified invite message 414. The platform short number field contains a platform short number, which is an extension number (e.g., "1234") of the device of the third-party call system 402 that is associated with the software platform 406. The platform short number is associated with an organizational account of the software platform 406. The organizational account is associated with an organization, such as a company. The organizational account can be unique to one company, and in some examples, different companies can have the same platform short number.

The destination client receives the modified invite message 414 and displays the caller name and platform short number in an incoming call page portion of the display based on a detection of the FXO flag. In some examples, the software platform 406 may transmit a notify message 416 to the destination device. The notify message 416 may be a SIP notify message. The notify message 416 includes the caller name field, a platform short number field, and an FXO flag. The caller name field, the platform short number field, and the FXO flag may be call option fields in a call information header of the notify message 416 or a PAI header of the notify message 416. The destination device receives the notify message 416 and displays the caller name and platform short number in a line status portion of the display based on a detection of the FXO flag.

Figure 5:
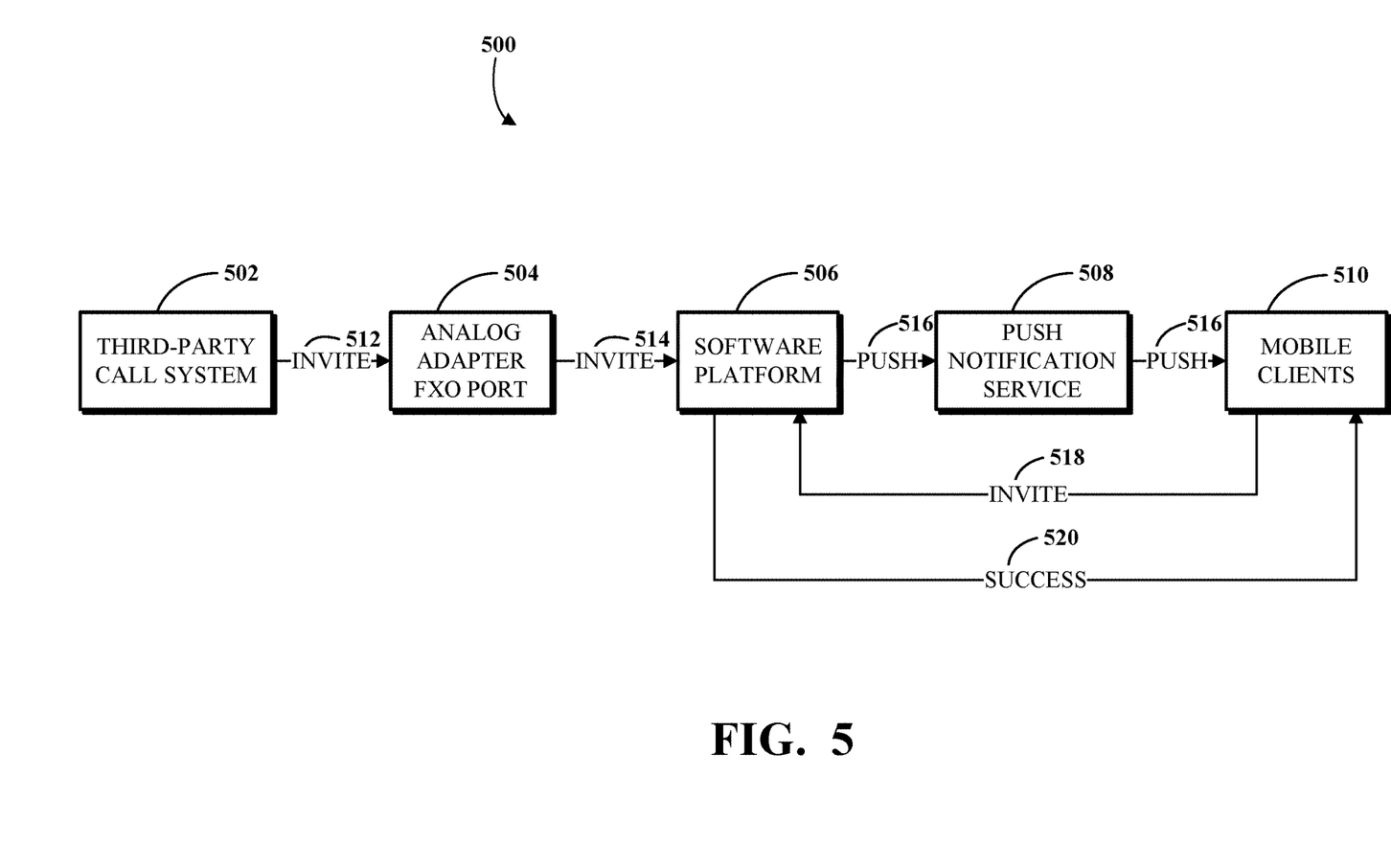
FIG. 5 is a block diagram of another example of a telephony system integrated with a third-party call system.

FIG. 5 is a block diagram of another example of a telephony system 500 integrated with a third-party call system 502. The third-party call system 502 may be the third-party call system 402 shown in FIG. 4. The telephony system 500 includes an FXO port 504, a software platform 506, a push notification service 508, and one or more clients 510. The FXO port 504 may be the FXO port 404 shown in FIG. 4. The software platform 506 may be the software platform 300 shown in FIG. 3. The push notification service 508 may include a processor configured to execute software to generate and transmit push messages. The processor of the push notification service 508 may be configured to execute software to provide a user access to an administrator portal to configure the system 500. The mobile clients 510 may include the computer 306 and/or the mobile device 308 shown in FIG. 3.

The third-party call system 502 is configured to transmit an invite message 512, such as a SIP invite message, to initiate a call between a telephony device of the third-party call system 402 and at least one mobile client of the one or more mobile clients 510. The invite message 512 may be the invite message 410 shown in FIG. 4.

The FXO port 504 is a hardware device configured to enable communication between the third-party call system 502 and the software platform 506. The FXO port 504 is configured to receive the invite message 512 and generate a modified invite message 514 as described for the FXO port 404 shown in FIG. 4. The modified invite message 514 may be a modified SIP invite message that is transmitted to the software platform 506.

The software platform 506 is configured to receive the modified invite message 514 and determine whether the call is an FXO call (i.e., a call from a device of the third-party call system 502). The discussion of how the software platform 506 determines whether the call is an FXO call is provided in the discussion of FIGS. 7A and 7B. The software platform 506 routes the call to a mobile client of the one or more mobile clients 510 (i.e., the destination client) when it is determined that the call is an FXO call. The software platform 506 routes the call to the destination client by generating a push message 516 and transmitting the push message 516 to the push notification service 508. The push message 516 includes the caller name field, a platform short number field, and an FXO flag. The caller name field, the platform short number field, and the FXO flag may be call option fields in a call information header of the push message 516 or a PAI header of the push message 516. The push message 516 may be in a JavaScript Object Notation (JSON) format or an extensible markup language (XML) format.

The push notification service 508 is configured to receive the push message 516 from the software platform 506. The push notification service 508 forwards the push message 516 to the one or more mobile clients 510. The push notification service 508 may include one or more third-party services to forward the push message 516 to the one or more mobile clients 510. In some examples, the computing device 508 may change the format of the push message 516 without changing the contents of the push message 516. The one or more mobile clients receive the push message 516 and display the caller name and the platform short number in a system notification portion of their respective displays. To accept the call, a mobile client of the mobile clients 510 transmits an invite message 518 to the software platform 506. If the acceptance of the call is successful, the software platform transmits a success message 520, such as a 200OK message, to the mobile client when the call is determined to be an FXO call. The success message 520 may include the caller name field, the platform short number field, and the FXO flag.

In a conventional system, a server of a software platform generates CDRs by obtaining user information from a database. The user information is typically obtained via a user extension ID that is unique for a given user. The server then determines whether the caller name and platform short number field are correct. For an FXO call, however, an external system name and short extension numbers are used, therefore the server cannot perform this type of checking (e.g., the user name will be wrong since it has been changed to a user name of the software platform). Accordingly, incorrect CDRs will be generated for an FXO call using conventional methods.

Figure 6:
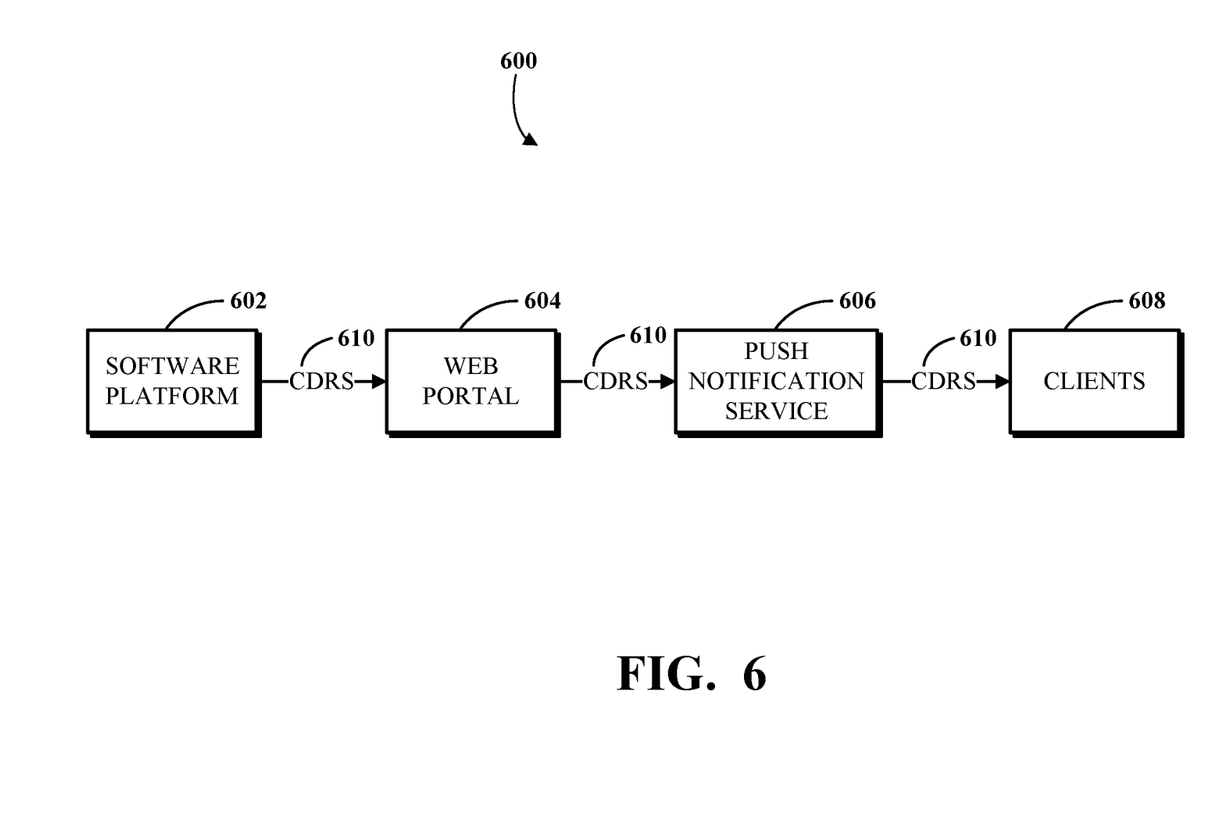
FIG. 6 is a block diagram of an example of call detail recording (CDR) for the telephony systems shown in FIGS. 4 and 5.

FIG. 6 is a block diagram of an example of CDR generation for an FXO call for a telephony system 600, such as the telephony systems 400 and 500 shown in FIGS. 4 and 5, respectively. The telephony system 600 includes a software platform 602, a web portal 604 associated with the software platform 602, a push notification service 606 associated with the software platform 602, and one or more clients 608.

The software platform 602 may be the software platform 406 shown in FIG. 4 or the software platform 506 shown in FIG. 5. The software platform 602 is configured to generate one or more CDRs 610 that contain an FXO flag and transmit the one or more CDRs to the web portal 604. The one or more CDRs 610 may be generated when the FXO call is terminated. The CDRs may include an FXO flag, call log data, voicemail data, call recordings, or any combination thereof. The web portal 604 is configured to forward the one or more CDRs to the push notification service 606. The push notification service 606 is configured to forward the one or more CDRs to the one or more clients 608. The FXO flag indicates to the one or more clients to not determine whether the caller name and platform short number field are correct. Instead, the one or more clients 608 are configured to obtain the caller name and the platform short number field from the call log data and display the caller name and the platform short number on their respective displays.

Figure 7A:
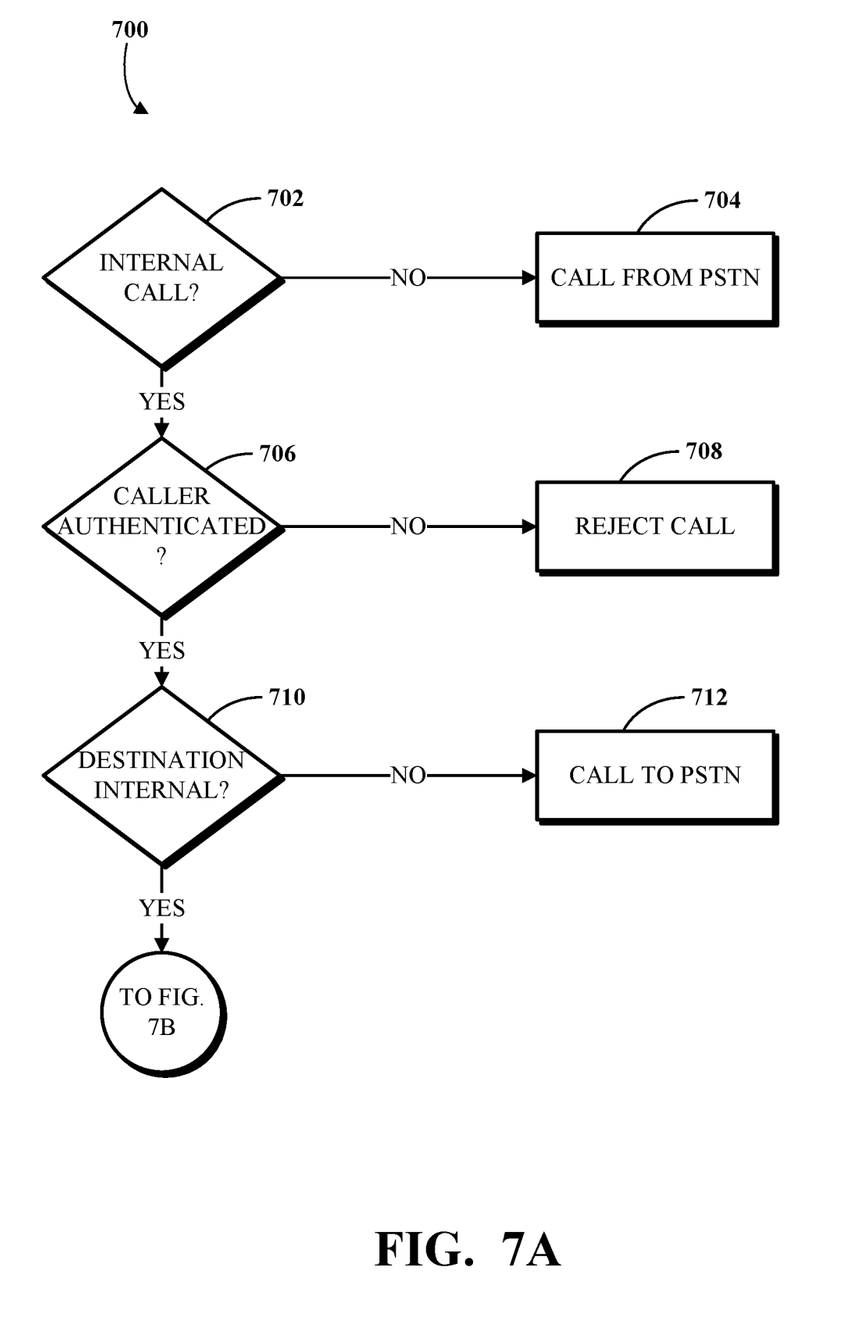
FIGS. 7A and 7B are a flowchart of an example of a method for call routing for the telephony systems shown in FIGS. 4 and 5.
Figure 7B:
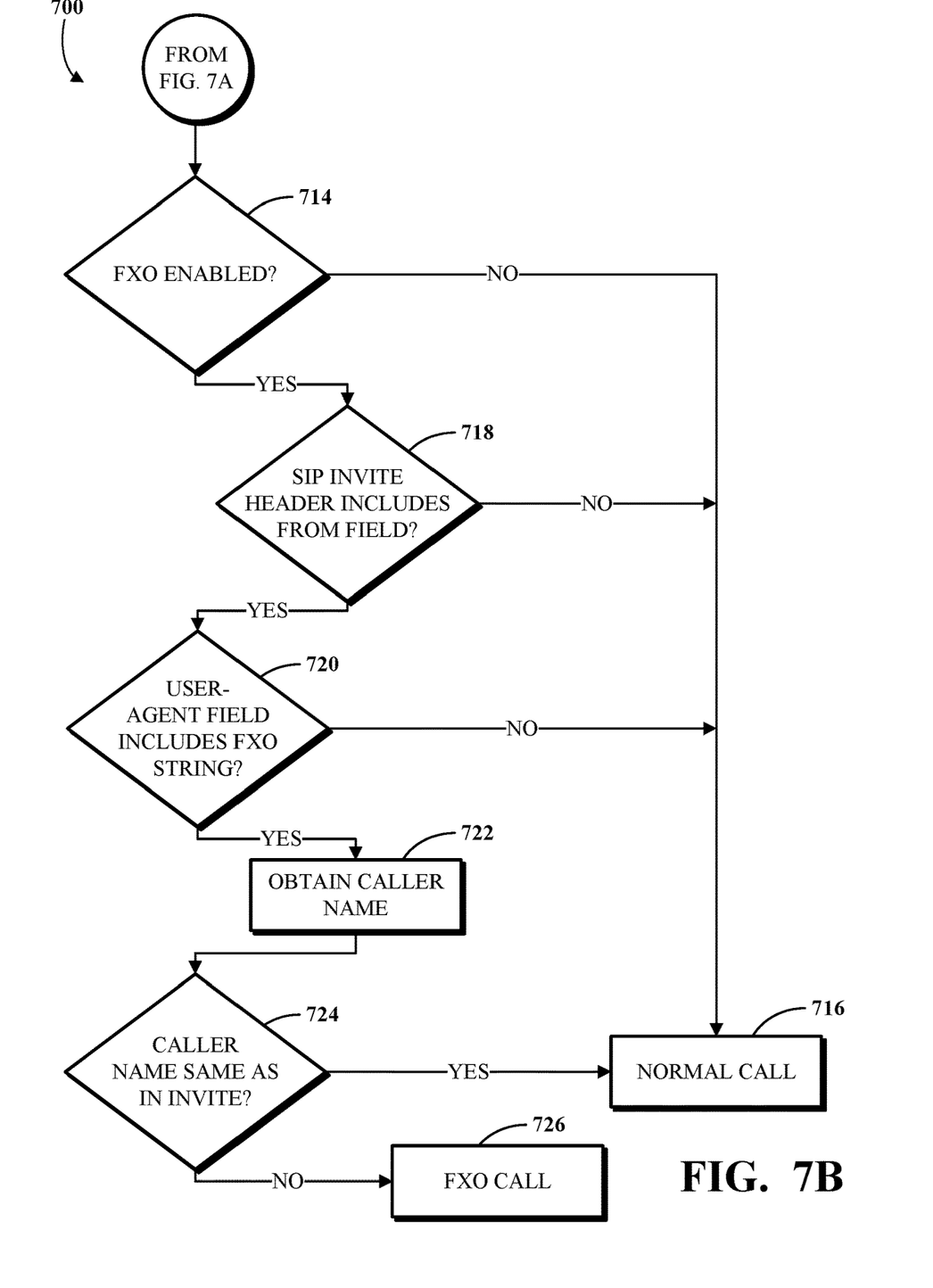
Figure 8:
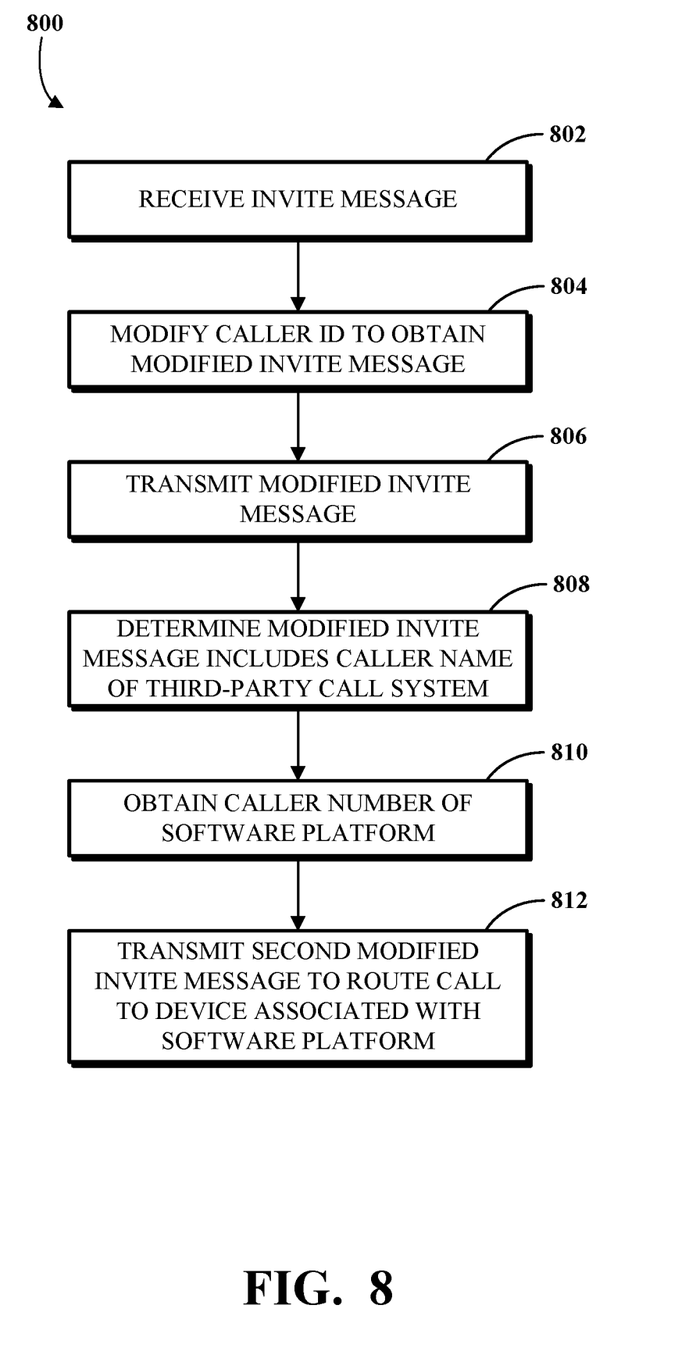
FIG. 8 is a flowchart of another example of a method for call routing for the telephony systems shown in FIGS. 4 and 5.

To further describe some implementations in greater detail, reference is next made to examples of techniques which may be performed by or using a system for caller ID presentation from third-party call system devices. FIGS. 7A-B and 8 are flowcharts of examples of techniques 700 and 800, respectively, for call routing for telephony systems integrated with third-party call systems. The techniques 700 and 800 can be executed using computing devices, such as the systems, hardware, and software described with respect to FIGS. 1-6. The techniques 700 and 800 can be performed, for example, by executing a machine-readable program or other computer-executable instructions, such as routines, instructions, programs, or other code. The steps, or operations, of the techniques 700 and 800, or another technique, method, process, or algorithm described in connection with the implementations disclosed herein can be implemented directly in hardware, firmware, software executed by hardware, circuitry, or a combination thereof.

For simplicity of explanation, the techniques 700 and 800 are depicted and described herein as a series of steps or operations. However, the steps or operations of the techniques 700 and 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIGS. 7A and 7B are a flowchart of an example of a method 700 for call routing for the telephony systems 400 and 500 shown in FIGS. 4 and 5, respectively. In this example, the telephony system is associated with a software platform and integrated with a third-party call system. When a SIP invite message for a call is received from a device of the third-party call system, the software platform determines at 702 whether the call is an internal call. If it is determined that the call is not an internal call, the software platform determines at 704 that the call is from a PSTN and processes the call as an external call. If it is determined that the call is an internal call, the software platform determines at 706 whether the caller is authenticated. If it is determined that the caller is not authenticated, the software platform rejects the call at 708. If it is determined that the caller is authenticated, the software platform determines at 710 whether the destination of the call is an internal device (i.e., a device associated with the software platform). If it is determined that the destination is not an internal device, the software platform determines at 712 that the call is to a PSTN and processes the call as such. If it is determined that the destination is an internal device, the software platform determines at 714 whether FXO calling is enabled. If FXO calling is not enabled, the software platform processes the call as a normal call (i.e., non-FXO call) at 716. If FXO calling is enabled, the software platform determines at 718 whether the SIP invite message includes a header that includes a from field. The from field includes information associated with the device from which the call originated. This information can include a caller name, a caller ID, a SIP register number, a domain, or any combination thereof. If it is determined that the header does not include a from field, the software platform processes the call as a normal call at 716. If it is determined that the header includes a caller name, the software platform determines at 720 whether a user-agent field of the header includes an FXO string. The FXO string may be an alphanumeric representation of "FXO" (e.g., "fxo", "FXO", "Fxo", "FXo", "fXo", or any permutation thereof). If the user-agent field of the header does not include an FXO string, the software platform processes the call as a normal call at 716. If the user-agent field of the header includes an FXO string, the software platform obtains the caller name from a database based on the SIP registration number at 722. The software platform determines whether the caller name is the same as the caller name indicated in the SIP invite message at 724. If it is determined that the caller name is the same as the caller name indicated in the SIP invite message, the software platform processes the call as a normal call at 716. If it is determined that the caller name is not the same as the caller name indicated in the SIP invite message, the software platform determines that the call is an FXO call at 726 and routes the call to a client of the software platform.

FIG. 8 is a flowchart of another example of a method 800 for call routing for the telephony systems 400 and 500 shown in FIGS. 4 and 5, respectively. At 802, the method 800 includes receiving an invite message. The invite message may be received at an FXO port associated with a software platform. The invite message may be a SIP invite message and may be associated with a call from a third-party call system. The invite message may include a caller name of the third-party call system, a caller ID of the third party call system, or both.

At 804, the method 800 includes modifying the caller ID to obtain a modified invite message. The caller ID included in the invite message may be modified to a SIP register number of the software platform. Modifying the caller ID may include obtaining the SIP register number based on a binding between the telephony device of the third-party call system and a user account of the software platform. In some implementations, the SIP register number may be obtained from a database of the FXO port.

At 806, the method 800 includes transmitting the modified invite message. The modified invite message may be transmitted to a server of the software platform.

At 808, the method 800 includes determining that the modified invite message includes the caller name of the third-party call system when a header of the modified invite message includes an FXO indicator. In some implementations, the determination that the modified invite message includes the caller name of the third-party call system may be performed based on a determination that the modified invite message is destined to a device associated with the software platform, a determination that the modified invite message is associated with an internal call, or both. The device associated with the software platform may be a VOIP phone.

At 810, the method 800 includes obtaining a caller number of the software platform. The caller number of the software platform may be obtained when a user-agent field of the modified invite message includes an FXO string.

At 812, the method 800 includes transmitting a second modified invite message to route the call to the device associated with the software platform. The second modified invite message may be transmitted when it is determined that the modified invite message includes the FXO string. The second modified invite message includes the caller name of the third-party call system and the caller number of the software platform for display on the device, for example, in a header of the second modified invite message. The header may be a SIP header or a PAI header. In some implementations, the second modified invite message may include the FXO indicator. The FXO indicator indicates to the device to display the caller name of the third-party call system and the caller number of the software platform.

An aspect may include a method that includes receiving, at an FXO port associated with a software platform, a SIP invite message associated with a call from a third-party call system. The SIP invite message may include a caller name of the third-party call system and a caller ID of the third-party call system. The method may include modifying the caller ID of the third-party call system to a SIP register number of the software platform to obtain a modified SIP invite message. The method may include determining whether the modified SIP invite message is destined to a device associated with the software platform. The method may include determining whether the modified SIP invite message includes the caller name of the third-party call system based on a SIP header of the modified SIP invite message including an FXO indicator. The method may include obtaining a caller number of the software platform from the SIP register number of the software platform based on a user-agent field of the modified SIP invite message including an FXO string. The method may include transmitting a second modified SIP invite message to route the call to the device based on the modified SIP invite message including the FXO indicator and the FXO string. The second modified SIP invite message may include the caller name of the third-party call system and the caller number of the software platform for display on the device.

An aspect may include a system that comprises a server associated with a software platform and an FXO port associated with the software platform. The FXO port may be configured to receive a SIP invite message associated with a call from a third-party call system. The SIP invite message may include a caller name of the third-party call system and a caller ID of the third-party call system. The FXO port may be configured to modify the caller ID of the third-party call system to a SIP register number of the software platform to obtain a modified SIP invite message. The server may be configured to determine whether the modified SIP invite message is destined to a device associated with the software platform. The server may be configured to determine whether the modified SIP invite message includes the caller name of the third-party call system based on a SIP header of the modified SIP invite message including an FXO indicator. The server may be configured to obtain a caller number of the software platform from the SIP register number of the software platform based on a user-agent field of the modified SIP invite message including an FXO string. The server may be configured to transmit a second modified SIP invite message to route the call to the device based on the modified SIP invite message including the FXO indicator and the FXO string. The second modified SIP invite message may include the caller name of the third-party call system and the caller number of the software platform for display on the device.

An aspect may include a non-transitory computer-readable medium comprising instructions that when executed by a processor, cause the processor to perform operations. The operations may include receiving, at an FXO port associated with a software platform, a SIP invite message associated with a call from a third-party call system. The SIP invite message may include a caller name of the third-party call system and a caller ID of the third-party call system. The operations may include modifying the caller ID of the third-party call system to a SIP register number of the software platform to obtain a modified SIP invite message. The operations may include determining whether the modified SIP invite message is destined to a device associated with the software platform. The operations may include determining whether the modified SIP invite message includes the caller name of the third-party call system based on a SIP header of the modified SIP invite message including an FXO indicator. The operations may include obtaining a caller number of the software platform from the SIP register number of the software platform based on a user-agent field of the modified SIP invite message including an FXO string. The operations may include transmitting a second modified SIP invite message to route the call to the device based on the modified SIP invite message including the FXO indicator and the FXO string. The second modified SIP invite message may include the caller name of the third-party call system and the caller number of the software platform for display on the device.

In one or more aspects, the FXO port may be an analog adapter FXO port. In one or more aspects, modifying the caller ID of the third-party call system to a SIP register number of the software platform may include obtaining the SIP register number based on a binding between the telephony device of the third-party call system and a user account of the software platform. In one or more aspects, the device may be a VOIP phone associated with the software platform. In one or more aspects, the FXO indicator may indicate to the device to display the caller name of the third-party call system and the caller number of the software platform. In one or more aspects, the second modified SIP invite message may include the caller name of the third-party call system and the caller number of the software platform in a SIP header. In one or more aspects, the second modified SIP invite message may include the caller name of the third-party call system and the caller number of the software platform in a PAI header. In one or more aspects, the SIP register number may be obtained from a database. In one or more aspects, the FXO indicator may indicate to the device to display the caller name of the third party call system. In one or more aspects, the second modified SIP invite message may include the caller name of the third-party call system. In one or more aspects, the second modified SIP invite message may include the caller number of the software platform. In one or more aspects, the SIP invite message may include a PAI header. In one or more aspects, the device may be a mobile device. In one or more aspects, modifying the caller ID may include obtaining the SIP register number from a database of the FXO port. In one or more aspects, the FXO indicator may indicate to the device to display the caller name of the third party call system. In one or more aspects, the second modified invite message may include the caller name of the third-party call system and the caller number of the software platform in a header of the second modified invite message. In one or more aspects, the FXO port may be an analog adapter associated with the software platform.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
receiving, at a hardware analog foreign exchange office (FXO) port associated with a software platform, an analog caller identification (ID) signal associated with a call that includes caller ID information from a third-party call system and a caller name of the third-party call system;
converting the analog caller ID signal to a digital session initiation protocol (SIP) invite message, wherein the caller ID information is preserved;
modifying the caller ID information of the third-party call system to a SIP register number of the software platform to obtain a modified SIP invite message;
determining whether the modified SIP invite message is destined to a device associated with the software platform;
determining whether the modified SIP invite message includes the caller name of the third-party call system based on a SIP header of the modified SIP invite message including an FXO indicator that indicates that the caller ID information originated from an analog source;
obtaining a caller number of the software platform from the SIP register number of the software platform based on a user-agent field of the modified SIP invite message including an FXO string; and
transmitting a second modified SIP invite message to route the call to the device based on the modified SIP invite message including the FXO indicator and the FXO string, wherein the second modified SIP invite message includes the caller name of the third-party call system and the caller number of the software platform for display on the device.

2. The method of claim 1, wherein the hardware analog FXO port is an analog adapter FXO port.

3. The method of claim 1, wherein modifying the caller ID information of the third-party call system to a SIP register number of the software platform includes obtaining the SIP register number based on a binding between a telephony device of the third-party call system and a user account of the software platform.

4. The method of claim 1, wherein the device is a voice-over-internet protocol (VOIP) phone associated with the software platform.

5. The method of claim 1, wherein the FXO indicator indicates to the device to display the caller name of the third-party call system and the caller number of the software platform.

6. The method of claim 1, wherein the second modified SIP invite message includes the caller name of the third-party call system and the caller number of the software platform in a SIP header.

7. The method of claim 1, wherein the second modified SIP invite message includes the caller name of the third-party call system and the caller number of the software platform in a P-asserted-identity (PAI) header.

8. A system, comprising:
a server of a software platform; and
a hardware analog foreign exchange office (FXO) port associated with the software platform, the FXO port configured to:
receive an analog caller identification (ID) signal associated with a call from a third-party call system that includes caller ID information from the third-party call system and a caller name of the third-party call system;
convert the analog caller ID signal to a digital session initiation protocol (SIP) invite message, wherein the caller ID information is preserved; and modify the caller ID information of the third-party call system to a SIP register number of the software platform to obtain a modified SIP invite message;
wherein the server is configured to:
determine whether the modified SIP invite message is destined to a device associated with the software platform;
determine whether the modified SIP invite message includes the caller name of the third-party call system based on a SIP header of the modified SIP invite message including an FXO indicator that indicates that the caller ID information originated from an analog source;
obtain a caller number of the software platform from the SIP register number of the software platform based on a user-agent field of the modified SIP invite message including an FXO string; and
transmit a second modified SIP invite message to route the call to the device based on the modified SIP invite message including the FXO indicator and the FXO string, wherein the second modified SIP invite message includes the caller name of the third-party call system and the caller number of the software platform for display on the device.

9. The system of claim 8, wherein the hardware analog FXO port is an analog adapter FXO port.

10. The system of claim 8, wherein the server is configured to obtain the SIP register number from a database.

11. The system of claim 8, wherein the FXO indicator indicates to the device to display the caller name of the third-party call system.

12. The system of claim 8, wherein the second modified SIP invite message includes the caller name of the third-party call system.

13. The system of claim 8, wherein the second modified SIP invite message includes the caller number of the software platform.

14. The system of claim 8, wherein the SIP invite message includes a P-asserted-identity (PAI) header.

15. A non-transitory computer-readable medium comprising instructions that when executed by a processor, cause the processor to perform operations, the operations comprising:
receiving, at a hardware analog foreign exchange office (FXO) port associated with a software platform, an analog caller identification (ID) signal associated with a call that includes caller ID information from a third-party call system and a caller name of the third-party call system;
converting the analog caller ID signal to a digital session initiation protocol (SIP) invite message, wherein the caller ID information is preserved;
modifying the caller ID information of the third-party call system to a SIP register number of the software platform to obtain a modified SIP invite message;
determining whether the modified SIP invite message is destined to a device associated with the software platform;
determining whether the modified SIP invite message includes the caller name of the third-party call system based on a SIP header of the modified SIP invite message including an FXO indicator that indicates that the caller ID information originated from an analog source;
obtaining a caller number of the software platform from the SIP register number of the software platform based on a user-agent field of the modified SIP invite message including an FXO string; and
transmitting a second modified SIP invite message to route the call to the device based on the modified SIP invite message including the FXO indicator and the FXO string, wherein the second modified SIP invite message includes the caller name of the third-party call system and the caller number of the software platform for display on the device.

16. The non-transitory computer-readable medium of claim 15, wherein the device is a mobile device.

17. The non-transitory computer-readable medium of claim 15, wherein modifying the caller ID includes obtaining the SIP register number from a database of the hardware analog FXO port.

18. The non-transitory computer-readable medium of claim 15, wherein the FXO indicator indicates to the device to display the caller name of the third-party call system.

19. The non-transitory computer-readable medium of claim 15, wherein the second modified invite message includes the caller name of the third-party call system and the caller number of the software platform in a header of the second modified invite message.

20. The non-transitory computer-readable medium of claim 15, wherein the hardware analog FXO port is an analog adapter associated with the software platform.

* * * * *